(12) United States Patent
Kortz et al.

(10) Patent No.: US 7,645,907 B2
(45) Date of Patent: Jan. 12, 2010

(54) TRANSITION METAL SUBSTITUTED POLYOXOMETALATES AND PROCESS FOR THEIR PREPARATION

(75) Inventors: Ulrich Kortz, Bremen (DE); Sib Sankar Mal, West Bengal (IN)

(73) Assignee: ExxonMobil Chemical Patents Inc., Houston, TX (US)

(*) Notice: Subject to any disclaimer, the term of this patent is extended or adjusted under 35 U.S.C. 154(b) by 460 days.

(21) Appl. No.: 11/728,142

(22) Filed: Mar. 23, 2007

(65) Prior Publication Data

US 2008/0233033 A1    Sep. 25, 2008

(51) Int. Cl.
| | |
|---|---|
| C07C 45/27 | (2006.01) |
| C07C 45/32 | (2006.01) |
| C07C 45/33 | (2006.01) |
| C07C 45/34 | (2006.01) |
| C01B 25/45 | (2006.01) |
| C01G 28/00 | (2006.01) |

(52) U.S. Cl. .......... 568/300; 423/306; 423/594.1; 423/594.2; 423/594.3; 423/594.4; 423/594.5; 423/594.6; 423/595; 423/596; 423/598; 423/599; 423/601; 568/309; 568/320

(58) Field of Classification Search .......... 423/306, 423/385, 593.1, 594.1, 594.14, 594.15, 594.2, 423/594.3, 594.5, 594.6, 594.9, 595, 598, 423/599, 601; 568/300, 309, 320
See application file for complete search history.

(56) References Cited

U.S. PATENT DOCUMENTS

| | | |
|---|---|---|
| 4,196,136 A | 4/1980 | Knoth, Jr. |
| 4,634,502 A | 1/1987 | Callahan et al. |
| 4,839,008 A | 6/1989 | Hill |
| 5,091,354 A | 2/1992 | Ellis, Jr. et al. |
| 5,475,178 A | 12/1995 | Del Rossi et al. |
| 5,616,815 A | 4/1997 | Atkins et al. |
| 5,629,459 A | 5/1997 | Atkins et al. |
| 5,684,216 A | 11/1997 | Haining |

(Continued)

FOREIGN PATENT DOCUMENTS

EP    0 442 663    8/1991

(Continued)

OTHER PUBLICATIONS

Adam et al., "A Highly Chemoselective, Diastereoselective, and Regioselective Epoxidation of Chiral Allylic Alcohols with Hydrogen Peroxide, Catalyzed by Sandwich-Type Polyoxometalates: Enhancement of Reactivity and Control of Selectivity by the Hydroxy Group through Metal-Alchoholate Bonding", J. of Org. Chem., 2003, vol. 68, No. 5, pp. 1721-1728.

(Continued)

Primary Examiner—Wayne Langel
Assistant Examiner—Brittany M Martinez (57) ABSTRACT

This invention relates to a Polyoxometalate (POM) represented by the formula: $(A_n)^{m+}[H_qM_{16}X_8W_{48}O_{184}(OH)_{32}]^{m-}$ or solvates thereof, wherein: A represents a cation, n is the number of the cations A, m is the charge of the polyoxoanion, q is the number of protons and varies from 0 to 12, M represents a transition metal, and X represents a heteroatom selected from P, As and mixtures thereof. This invention also relates to a process to produce such POMs and to a process for the homogeneous or heterogeneous oxidation of organic substrates comprising contacting the organic substrate with such POMs.

39 Claims, 1 Drawing Sheet

U.S. PATENT DOCUMENTS

| | | | |
|---|---|---|---|
| 5,705,685 | A | 1/1998 | Lyons et al. |
| 5,714,429 | A | 2/1998 | Haining |
| 5,928,382 | A | 7/1999 | Reinhardt et al. |
| 5,990,348 | A | 11/1999 | Lyons et al. |
| 6,022,986 | A | 2/2000 | Scharbert et al. |
| 6,043,184 | A | 3/2000 | Karmakar et al. |
| 6,060,419 | A | 5/2000 | Wijesekera et al. |
| 6,114,274 | A | 9/2000 | Bordes et al. |
| 6,169,202 | B1 | 1/2001 | Wijesekera et al. |
| 6,387,841 | B1 | 5/2002 | Devlin et al. |
| 6,455,735 | B1 | 9/2002 | Choudary et al. |
| 6,518,216 | B1 | 2/2003 | Han et al. |
| 6,610,864 | B2 | 8/2003 | Krebs et al. |
| 6,664,408 | B2 | 12/2003 | Peng et al. |
| 6,710,207 | B2 | 3/2004 | Bogan, Jr. et al. |
| 6,743,748 | B2 | 6/2004 | Mizuno et al. |
| 6,809,219 | B2 | 10/2004 | Han et al. |
| 7,019,165 | B2 | 3/2006 | Davis et al. |
| 7,097,858 | B2 | 8/2006 | Hill et al. |
| 7,358,380 | B2 | 4/2008 | Kortz et al. |
| 2002/0091275 | A1 | 7/2002 | Krebs et al. |
| 2002/0142914 | A1 | 10/2002 | Devlin et al. |
| 2002/0165405 | A1 | 11/2002 | Peng et al. |
| 2003/0017561 | A1 | 1/2003 | Lee et al. |
| 2003/0036473 | A1 | 2/2003 | Busch et al. |
| 2003/0109740 | A1 | 6/2003 | Gotz et al. |
| 2003/0144550 | A1 | 7/2003 | Davis et al. |
| 2003/0157012 | A1 | 8/2003 | Pope et al. |
| 2003/0171604 | A1 | 9/2003 | Mizuno et al. |
| 2003/0187297 | A1 | 10/2003 | Bogan, Jr. et al. |
| 2004/0185078 | A1 | 9/2004 | Hill et al. |
| 2004/0185116 | A1 | 9/2004 | Hill et al. |
| 2004/0210086 | A1 | 10/2004 | Bogan, Jr. et al. |
| 2005/0112055 | A1 | 5/2005 | Shannon et al. |
| 2006/0142620 | A1 | 6/2006 | Deshpande et al. |
| 2007/0027339 | A1 | 2/2007 | Fullerton |
| 2007/0093379 | A1 | 4/2007 | Busch et al. |
| 2007/0282138 | A1 | 12/2007 | Richards et al. |
| 2008/0177118 | A1 | 7/2008 | Kortz et al. |

FOREIGN PATENT DOCUMENTS

| | | |
|---|---|---|
| EP | 0 955 284 | 11/1999 |
| EP | 1 059 276 | 12/2000 |
| EP | 1 077 082 | 2/2001 |
| EP | 1 078 687 | 2/2001 |
| EP | 1 080 784 | 7/2001 |
| EP | 1 142 638 | 10/2001 |
| EP | 1 201 636 | 5/2002 |
| EP | 1 205 474 | 7/2004 |
| EP | 1 213 280 | 9/2004 |
| JP | 2003/34996 | 10/2003 |
| WO | WO 00/09262 | 2/2000 |
| WO | WO 03/028881 | 4/2003 |

OTHER PUBLICATIONS

Anderson et al., "A Late-Transition Metal Oxo Complex: $K_7Na_9[O=Pt^{IV}(H_2O)L_2]$, $L=[PW_9O_{34}]^{9-}$", Science, 2004, vol. 306, pp. 2074-2077.

Anderson et al., "A Palladium-Oxo Complex. Stabilization of this Proposed Catalytic Intermediate by an Encapsulating Polytungstate Ligand", J. of Amer. Chem. Soc., 2005, vol. 127, No. 34, pp. 11948-11949.

Angus-Dunne et al., "A Novel Heteropolymetalate Containing Palladium(II): Synthesis and Crystal Structure of $K_2Na_6[Pd_2W_{10}O_{36}]\cdot 22H_2O$", J. Chem. Soc. Chem. Commun., 1994, pp. 523-524.

Bi, et al., "First Structurally Characterized Palladium(II)- Substituted Polyoxoanion:$[Cs_2Na(H_2O)_{10}Pd_3(\alpha-Sb^{III}W_9O_{33})_2]^{9-}$", Inorg. Chem., 2004, vol. 34, No. 13, pp. 3915-3920.

Bi, et al., "Synthesis and Structure of the Pentacopper(II) Substituted Tungstosilicate $[Cu_5(OH)_4(H_2O)_2(A-\alpha-SiW_9O_{33})_2]^{10-}$", Inorg. Chem., 2004, vol. 43, No. 25 pp. 7961-7962.

Bi, et al., "Palladium (II)-Substituted Tungstosilicate $[Cs_2K(H_2O)_7Pd_2WO(H_2O)(A-\alpha-SiW_9O_{34})_2]^{9-}$", Inorg. Chem., 2004, vol. 43, No. 26, pp. 8367-8372.

Bi, et al., "The Palladium (II)-Substituted Lone Pair Containing Tungstoarsenates(III) $[Na_2(H_2O)_2PdWO(H_2O)(\alpha-AsW_9O_{33})_2]^{10-}$ and $[Cs_2Na(H_2O)_8Pd_3(\alpha-AsW_9O_{33})_2]^{9-}$", Eur. J. Inorg. Chem., 2005, pp. 3034-3041.

Bösing, et al., "New Strategies for the Generation of Large Heteropolymetalate Clusters: The $\beta-B-SbW_9$ Fragment as a Multifunctional Unit", Chem. Eur. J., 1997, vol. 3, No. 8, pp. 1232-1237.

Bösing, et al., "Highly Efficient Catalysts in Directed Oxygen-Transfer Processes: Synthesis, Structures of Novel Manganese-Containing Heteropolyanions, and Applications in Regioselective Epoxidation of Dienes with Hydrogen Peroxide", J. Am. Chem. Soc., vol. 120, No. 29, 1998, pp. 7252-7259.

Cavani, et al., " Combined effects of Sb-doping and preparation via lacunary precursor for P/Mo-based, Keggin-type poloxometalates, catalysts for the selective oxidation of isobutane to methacrylic acid, Topics in Catalysis", 2003, vol. 23, Nos. 1-4, pp. 119-124.

Cavani, et al., "Improvement of catalytic performance in isobutane oxidation to methacrylic acid of Keggin-type phosphomolybdates by preparation via lacunary precursors: nature of the active sites", Catalysis Letters, 2001, vol. 75, No. 1-2, pp. 99-105.

Cavani, "Heteropolycompound-Based Catalysts: A Blend of Acid and Oxidizing Properties," Catalysis Today 41, 1998, pp. 73-86.

Choi, et al., "Observation of a Half Step Magnetization in the $\{Cu_3\}$-Type Triangular Spin Ring", Physical Review Letters, 2006, PRL 96, pp. 107202-1-107202-4.

Haber, et al., "Catalytic performance of the dodecatungstophosphoric acid on different supports", Applied Catalysis A: General 256, 2003, pp. 141-152.

Hu, et al., "Homogeneous-phase catalytic $H_2O_2$ oxidation of isobutyraldehyde using Keggin, Dawson and transition metal-substituted lacunary heteropolyanions", Journal of Molecular Catalysis A: Chemical, 2002, vol. 184, pp. 451-464.

Kamata, et al., "Efficient Epoxidation of Olefins with $\geq$ 99% Selectivity and Use of Hydrogen Peroxide", Science, 2003, vol. 300, pp. 964-966.

Knoth, "Derivatives of Heteropolyanions. 2. Metal-Metal-Bonded Derivatives". J. Am. Chem. Soc., 1979, vol. 101, No. 8, pp. 2211-2212.

Kortz, et al., "Synthesis and Characterization of Copper-, Zinc-, Manganese-, and Cobalt-Substituted Dimeric Heteropolyanions, $[(\alpha-XW_9O_{33})_2M_3(H_2O)_3]^{n-}$ ($n=12$, $X=As^{III}$, $Sb^{III}$, $M=Cu^{2+}$, $Zn^{2+}$; $n=10$, $X=Se^{IV}$, $Te^{IV}$, $M=Cu^{2+}$) and $[(\alpha-AsW_9O_{33})_2WO(H_2O)M_2(H_2O)_2]^{10-}$ ($M=Zn^{2+}$, $Mn^{2+}$, $CO^{2+}$)", Inorg. Chem., 2001, vol. 40, No. 18, pp. 4742-4749.

Kortz, et al., "Sandwich-Type Germanotungstates: Structure and Magnetic Properties of the Dimeric Polyoxoanions $[M_4(H_2O)_2(GeW_9O_{34})_2]^{12-}$ ($M=Mn^{2+}$, $Cu^{2+}$, $Zn^{2+}$, $Cd^{2+}$)", Inorg. Chem., 2004, vol. 43, No. 7, pp. 2308-2317.

Kortz, et al., "Sandwich-Type Silicotungstates: Structure and Magnetic Properties of the Dimeric Polyoxoanions $[\{SiM_2W_9O_{34}(H_2O)\}_2]^{12-}$ ($M=Mn^{2+}$, $Cu_{2+}$, $Zn_{2+}$)", Inorg. Chem., 2000, vol. 39, No. 13, pp. 2915-2922.

Kortz, et al., "Structure and Magnetism of the Tetra-Copper(II)-Substituted Heteropolyanion $[Cu_4K_2(H_2O)_8(\alpha-AsW_9O_{33})_2]^{8-}$", Inorg. Chem., 2004, vol. 43, No. 1, pp. 144-154.

Kortz, et al., "Synthesis and Characterization of Iron(III)-Substituted, Dimeric Polyoxotungstates, $[Fe_4(H_2O)_{10}(\beta-XW_9O_{33})_2]n-$ ($n=6$, $X=As^{III}$, $SB^{III}$; $n=4$, $X=Se^{IV}$, $Te^{IV}$)", Inorg. Chem., 2002, vol. 41, No. 4, pp. 783-789.

Krebs, et al., "Syntheses and Crystal Structure Studies of Novel Selenoum- and Tellurium-Substituted Lacunary Polyoxometalates", Polyoxometalate Chemistry, 2001, pp. 89-99.

Krebs, et al., "Synthesis and Structural Chemistry of Novel Heteropolymolybdates and -tungstates," Molecular Engineering 3, 1993, pp. 43-59.

Kuznestsova, et al., "$O_2/H_2$ Oxidation of Hydrocarbons on the Catalysts Prepared from Pd (II) Complexes with Heteropolytungstates", 3rd World Congress on Oxidation Catalysis, Elsevier Science B.V., 1997, pp. 1203-1211.

Lee, et al., "Anhydrous octaguanidinium hexatungstoplatinate(IV)", Acta Cryst., 2003, E59, m116-m118.

Lee, et al., "Dipotassium Hexahydrogen-α-hexamolybdoplatinate(IV) Pentahydrate, $K_2[H_6\alpha\text{-PtMo}_6O_{24}]\cdot 5H_2O$", Acta Crystallographica Section C, 1994, C50, pp. 1657-1659.

Lee, et al., "Synchroton structure determination of an α-Keggin doubly $Pt^{IV}$—substituted silicotungstate, $(CH_6N_3)_8[\alpha\text{-SiPt}_2\text{-}W_{10}O_{40}]\cdot 6H_2O$", Acta Cryst. Section C, 2003, C59, m152-m155.

Lee, et al., "The Geometrical Isomerization on Acidification in Hexamolydoheteropoly Oxometalate. The Crystal Structure of $(NH_4)_{4.5}[H_{3.5}\alpha\text{-PtMo}_6O_{24}]\cdot 1.5H_2O$, $(NH_4)_4[H_4\text{b-PtMo}_6O_{24}]\cdot 1.5H_2O$, and $K_{3.5}[H_{4.5}\alpha\text{-PtMo}_6O_{24}]\cdot 3H_2O$", Bull. Korean Chem. Soc., 1994, vol. 15, No. 1, pp. 37-45.

Li, et al., "Lacunary Keggin Polyoxotungstate as Reaction-controlled Phase-transfer Catalyst for Catalytic Epoxidation of Olefins", Chinese Journal of Chemistry, 2004, vol. 22, No. 8, pp. 874-876.

Loose, et al., "Heteropolymetalate Clusters of the Subvalent Main Group Elements $Bi^{III}$ and $SB^{III}$", Inorg. Chem., 1999, vol. 38, No. 11. pp. 2688-2694.

Misono, et al., "Recent progress in catalytic technology in Japan", Applied Catalysis, 1990, vol. 64, pp. 1-30.

Misono, "Unique acid catalysis of heteropoly compounds (heteropolyoxometalates) in the solid state", Chem. Comm., 2001, pp. 1141-1152.

Mizuno, et al., "Heterogeneous Catalysis", Chem. Rev., 1998, vol. 98, No. 1, pp. 199-217.

Neumann, et al, "Hydroxylation of Alkanes with Molecular Oxygen Catalyzed by a New Ruthenium-Substituted Polyoxometalate, $[WZnRu_2^{III}(OH)(H_2O)(ZnW_9O_{34})_2]^{11-}$", Angew. Chem. Int. Ed. Engl., 1995, vol. 34, No. 15, pp. 1587-1589.

Neumann, et al., "Noble Metal ($Ru^{III}$, $Pd^{II}$, $Pt^{II}$) Substituted "Sandwich" Type Polyoxometalates: Preparation, Characterization, and Catalytic Activity in Oxidations of Alkenes and Alkenes by Peroxides", Inorg. Chem., 1995, vol. 34, No. 23, pp. 5753-5760.

Neumann, et al., "Molecular Oxygen Activation by a Ruthenium-Substituted "Sandwich" Type Poloxometalate", J. Am. Chem. Soc., 1998, vol. 120, No. 46, pp. 11969-11976.

Neumann, "Polyoxometalate Complexes in Organic Oxidation Chemistry", Progress in Inorganic Chemistry, 1998, vol. 47, pp. 317-370.

Okun, et al., "$[(Fe^{III}(OH_2)_2)_3(A\text{-}\alpha\text{-PW}_9O_{34})_2]^{9-}$ on Cationic Silica Nanoparticles, a New Type of Material and Efficient Heterogeneous Catalyst for Aerobic Oxidations", J. of Am. Chem. Soc., 2003, vol. 125, No. 11, pp. 3194-3195.

Ratiu, et al., "Synthesis and characterization of $K_6[Ti(H_2O)P_2MoW_{16}O_{61}]\cdot 17H_2O$, a Ti(IV) derivative of monolacunary Wells-Dawson 16-tungsto-molybdo-2-phosphate", Polyhedron, 2002, vol. 21, pp. 353-358.

Rong, et al., "Lacunary Polyoxometalate Anions Are π-Acceptor Ligands. Characterization of Some Tungstoruthenate(II,III,IV,V) Heteropolyanions and Their Atom-Transfer Reactivity", J. Am. Chem. Soc., 1992, vol. 114, No. 8, pp. 2932-2938.

Rusu, et al., "FT-IR, UV-VIS and EPR investigations of multicopper polyoxotungstates will $Bi^{III}$ as heteroatom", Journal of Molecular Structure 563-564, 2001, pp. 427-433.

Rusu, et al., "Spectroscopic and electron paramagnetic resonance behavior of trinuclear metallic clusters encapsulated in $[Mn+_3(H_2O)_x(BiW_9O_{33})_2]^{(18-3n)-}$ heteropolyanions ($Mn+=(VO)^{II}$, x=0 and $Mn+=Cr^{III}$, $Mn^{II}$, $Fe^{III}$, $Co^{II}$, $Ni^{II}$, $Cu^{II}$, x=3)", J. Chem. Soc., Dalton Trans., 2001, pp. 2879-2887.

Server-Carrio, et al., "Synthesis Characterization, and Catalysis of $\beta_3\text{-}[(Co^{II}O_4)W_{11}O_{31}(O_2)_4]^{10-}$ the First Keggin-Based True Heteropoly Dioxygen (Peroxo) Anion. Depctroscopic (ESR, IR) Evidence for the Formation of Superoxo Polytungstates", J. Am. Chem. Soc., 1999, vol. 121, No. 5, pp. 977-984.

Sousa, et al., "Novel cerium (IV) heteropolyoxtungstate containing two types of lacunary Keggin anions", Chem. Comm., 2004, pp. 2656-2657.

Stowe, et al., "Magnetic Properties of Lone-Pair-Containing, Sandwich-Type Polyoxoanions: A Detailed Study of the Heteroatomic Effect", Eur. J. Inorg. Chem., 2004, pp. 3792-3797.

Villanneau, et al., "Co-ordination chemistry of lacunary Lindqvist-type polyoxometalates:cubic vs. square-antiprismatic co-ordination", J. Chem. Soc., Dalton Trans., 1999, pp. 421-426.

Yamase et al., "Ferromagnetic Exchange Interactions for $Cu_6^{12+}$ and $Mn_6^{12+}$ Hexagons Sandwiched by Two B-α-$[XW_9O_{33}]^{9-}$ ($X=As^{III}$ and $Sb^{III}$) Ligands in $D_3d$-Symmetric Polyoxotungstates", Inorg. Chem., 2006, vol. 45, No. 19, pp. 7698-7704.

Yin, et al., "Autoxidation-Product-Initated Dioxygenases:Vanadium-Based, Record Catalytic Lifetime Catechol Dioxgenase Catalysis", Inorg. Chem., 2005, vol. 44, No. 23, pp. 8521-8530.

R. Conant et al., A New Crown Heteropolyanion, $K_{28}Li_5H_7P_8W_{48}O_{184}92H_2O$: Synthesis, Structure, and Properties, American Chemical Society, Inorg. Chem. 1985, vol. 24, 1985, pp. 4610-4614.

M. Zimmermann et al., New Lanthanide-Containing Polytungstates Derived from the Cyclic Polytungstates Derived from the Cyclic P8W48 Anion: $\{Ln_4(H_2O)_{28}[KCP_8W_{48}O_{184}(H_4W_4O_{12})_2Ln_2(H_2O)_{10}]^{13-}\}x$, Ln=La, Ce, Pr, Nd, American Chemical Society, Inorganic Chemistry, vol. 46, No. 5, 2007, ppg. 1737-1740.

M. S. Alam, et al., STM/STS Observation of Polyoxoanions on HOPG Surfaces: the Wheel-Shaped $[Cu_{20}Cl(OH)_{24}(H_2O)_{12}(P_8W_{48}O_{184})]^{25-}$ and the Ball-Shaped $[\{Sn(CH_3)_2(H_2O)\}_{24}\{Sn(CH_3)_2\}(A\text{-PW}_9O_+)_{12}]^{36-}$, American Chemical Society, Inorg. Chem. 2006, vol. 45, No. 7, pp. 2866-2872.

S.S.Mal et al., "The Wheel-Shapede $Cu_{20}$ Tungstophosphate $[Cu_{20}Cl(OH)_{24}(H_2O)_{12}(P_8W_{48}O_{184})]^{25-}$ Ion," Angew. Chem. Int. Ed., 2005, vol. 44, pp. 3777-3780.

G. Liu et al., Wheel-Shaped Polyoxotungstate $[Cu_{20}Cl(OH)_{24}(H_2O)_{12}(P_8W_{48}O_{184})]^{25-}$, Macroanions Form Supramolecular "Blackberry" Structure in Aqueous Solution, American Chemical Society, 2006, vol. 128, pp. 10103-10110.

D.Jabbour et al., "The wheel-shaped $Cu20$-tungstophosphate $[Cu_{20}Cl(OH)_{24}(H_2O)_{12}(P_8W_{48}O_{184})]^{25-}$, redox and electrocatalytic properties", Electrochemistry Communications, vol. 7, 2005, pp. 841-847.

R. Contant, Potassium Lithium Octatetracontatungstoctaphosphate, $K_{28}Li_5H_7(P_8W_{48}O_{184})92H_2O$, Inorg. Synth., 1990, vol. 27, pp. 110-111.

Godin, et al., Coordination Chemistry of the Hexavacant Tungstophophate $[H_2P_2W_{12}O_{48}]$, Towards Original Structures of Increasing Size and Complexity; Angew. Chem. Int. Ed.; vol. 44, No. 20; 2005; pp. 3072-3075.

Hussain et al., Tetrakis(dimethyltin)-Containing Tungstophosphate $[\{Sn(CH_3)_2\}_4(H_2P_4W_{24}O_{92})_2]^{28-}$: First Evidence for a Lacunary Preyssier Ion; Inorganic Chemistry; vol. 45, No. 2; 2006; pp. 761-766.

Contant et al., A New Crown Heteropolyanion $K_{28}LI_5H_7P_8W_{48}O_{184}\cdot 92H_2O$: Synthesis, Structure, and Properties; American Chemical Society; 1985; vol. 24, No. 26; pp. 4610-4614.

Mal et al., The Wheel-Shaped $Cu20$ Tungstophosphate $[Cu_{20}Cl(OH)_{24}(H_2O)_{12}(P_8W_{48}O_{184})]^{25-}$ Ion; Angew. Chem. Int. Ed.; 2005; vol. 44, No. 24; pp. 3777-3780.

Zimmermann et al., Lanthanide-Containing Polytungstates Derived from the Cyclic $P_8W_{48}$ Anion: $\{Ln_4(H_2O)_{28}[K \subset P_8W_{48}O_{184}(H_4W_4O_{12})_2Ln_2(H_2O)_{10}]^{—}\}x$, Ln=La, Ce, Pr, Nd; Inorganic Chemistry; vol. 46, No. 5; 2007; pp. 1737-1740.

TRANSITION METAL SUBSTITUTED POLYOXOMETALATES AND PROCESS FOR THEIR PREPARATION

STATEMENT OF RELATED CASES

This invention is related to U.S. Ser. No. 11/443,683, filed May 31, 2006, U.S. Ser. No. 11/445,073, filed May 31, 2006, Ser. No. 11/445,095, filed May 31, 2006, and Ser. No. 11/655,593, filed Jan. 19, 2007

FIELD OF THE INVENTION

This invention relates to new transition metal substituted polyoxymetalates, a process for their preparation and their use for the catalytic oxidation of organic molecules.

BACKGROUND OF THE INVENTION

Polyoxometalates (POMs) are a unique class of inorganic metal-oxygen clusters. They consist of a polyhedral cage structure or framework bearing a negative charge, which is balanced by cations that are external to the cage, and may also contain centrally located heteroatom(s) surrounded by the cage framework. Generally, suitable heteroatoms include Group IIIa-VIa elements such as phosphorus, antimony, silicon and boron. The framework of polyoxometalates comprises a plurality of metal atoms (addenda), which can be the same or different, bonded to oxygen atoms. Due to appropriate cation radius and good π-electron acceptor properties, the framework metal is substantially limited to a few elements including tungsten, molybdenum, vanadium, niobium and tantalum.

In the past, there have been increasing efforts towards the modification of polyoxoanions with various organic and/or transition metal complex moieties with the aim of generating new catalyst systems as well as functional materials with interesting optical, electronic and magnetic properties. In particular, transition metal substituted polyoxometalates (TMSPs) have attracted continuously growing attention as they can be rationally modified on the molecular level including size, shape, charge density, acidity, redox states, stability, solubility etc.

For example, Contant et al. report on the crown heteropolyanion $[H_7P_8W_{48}O_{184}]^{33-}$ (R. Contant and A. Tézé, Inorg. Chem. 1985, 24, 4610-4614; R. Contant, Inorg. Synth., 1990, 27, 110-111). This polyanion is composed of four $[H_2P_2W_{12}O_{48}]^{12-}$ fragments which are linked by capping tungsten atoms resulting in a cyclic arrangement having a large central cavity. $[H_7P_8W_{48}O_{184}]^{33-}$ is described to be rather stable in aqueous solution and to yield no complexes with di- or trivalent transition metal ions.

Nevertheless, Kortz et al. disclose the use of $[H_7P_8W_{48}O_{184}]^{33-}$ as a superlacunary polyanion (Angew. Chem. Int. Ed. 2005, 44, 3777-3780). The interaction of $CuCl_2$ with $K_{28}Li_5[H_7P_8W_{48}O_{184}]$ in aqueous medium at pH 6 results in the formation of the large wheel-shaped anion $[Cu_{20}(OH)_{24}(H_2O)_{12}(P_8W_{48}O_{184})]^{25-}$. During this synthesis the structure of the annular $[H_7P_8W_{48}O_{184}]^{33-}$ precursor is maintained and its cavity is filled with a highly symmetrical copper-hydroxo cluster bearing terminal water ligands. $[Cu_{20}(OH)_{24}(H_2O)_{12}(P_8W_{48}O_{184})]^{25-}$ and its qualities such as redox and electrocatalytic properties have been the target of several studies (Nadjo et al., Electrochemistry Communications 2005, 7, 841-847; Kortz et al. Inorg. Chem. 2006, 45, 2866-2872; Kortz et al. J. Am. Chem. Soc. 2006, 128, 10103-10110).

Moreover, there have been remarkable efforts to prepare and study other $(P_8W_{48}O_{184})$-based polyanion structures using other transition metals. However, up to now only the synthesis of lanthanide-containing $\{Ln_4(H_2O)_{28}[KP_8W_{48}O_{184}(H_4W_4O_{12})_2Ln_2(H_2O)_{10}]^{13-}\}_x$, Ln=La, Ce, Pr, Nd is reported (Kortz et al., Inorg. Chem., 46 (5), 2007, 1737-1740, web release date: Feb. 13, 2007, DOI 10.1021/ic0624423). The central cavity of this polyanion is occupied by two $W_4O_{12}$ groups, two potassium ions and four lanthanide cations which have an occupancy of 50%.

It is the object of the present invention to provide further transition metal substituted $(P_8W_{48}O_{184})$-based polyoxometalates. Such transition metal substituted POMs should be useful as catalysts in homogeneous and heterogeneous oxidation reactions of organic substrates. In addition, they should be easy and reproducible to prepare.

SUMMARY OF THE INVENTION

This invention relates to Polyoxometalate represented by the formula:

or solvates thereof, wherein
A represents a cation,
n is the number of the cations A,
m is the charge of the polyoxoanion,
q is the number of protons and varies from 0 to 12,
M represents a transition metal, and
X represents a heteroatom selected from P, As and mixtures thereof.

DETAILED DESCRIPTION

This invention relates to, and the objects described above are achieved by, polyoxometalates represented by the formula or solvates thereof, wherein
A represents a cation,
n is the number of the cations A,
m is the charge of the polyoxoanion,
q is the number of protons and varies from 0 to 12,
M represents a transition metal, and
X represents a heteroatom selected from P, As and mixtures thereof.

Figure 1:
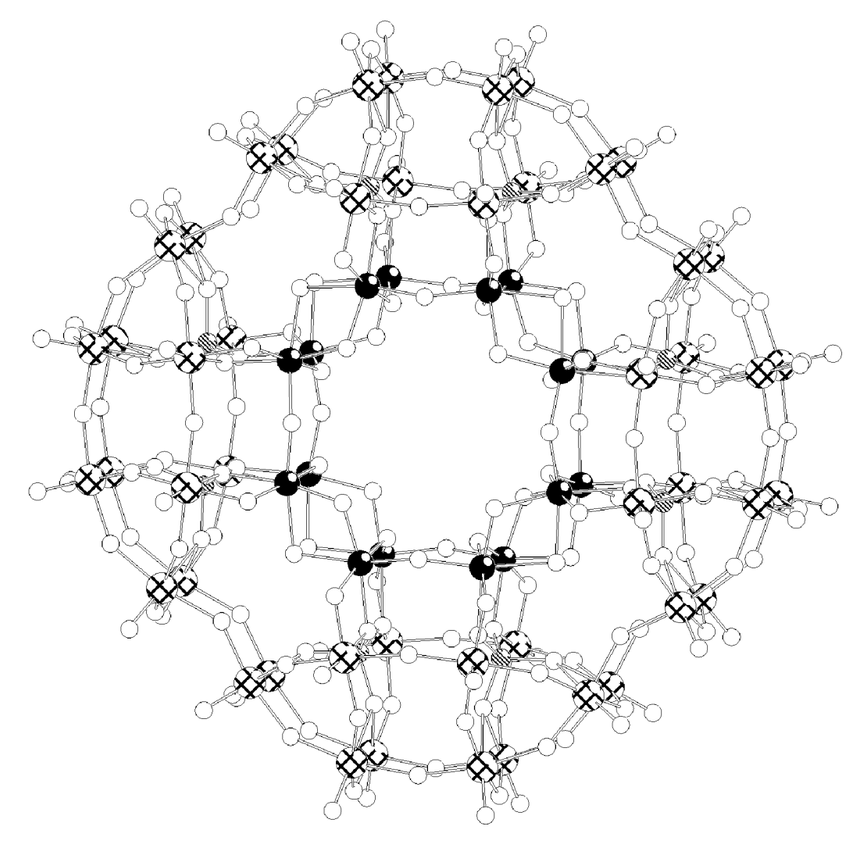
The FIGURE is an illustration of structures of the polyanions described herein.

The polyanion $[H_qM_{16}X_8W_{48}O_{184}(OH)_{32}]^{m-}$ of the polyoxometalates according to the invention has been found to exist in a highly symmetrical cyclic structure comprising a fragment $(X_8W_{48}O_{184})$. This fragment contains, preferably consists of, four $(X_2W_{12}O_{48})$ units which are linked via the two tungsten atoms of each cap resulting in a wheel-shaped arrangement having a large central cavity. The transition metal atoms M interact with the 16 inner oxo-groups of the $(X_8W_{48}O_{184})$-fragment, i.e. the oxo groups of all terminal W—O-bonds inside the cavity. Moreover, all transition metal atoms are coordinated to neighbouring metal centers via oxo-ligands which are monoprotonated. Accordingly, the cavity of the $(X_8W_{48}O_{184})$-fragment is occupied by a metal-hydroxo cluster which itself also shows a cage-like structure having a cavity. Thus, the polyoxometalates according to the invention are transition metal-substituted POMs having an annulus of metal ions. The structure of the present polyanions is also illustrated in FIG. 1. The balls of this FIGURE represent transition metal atoms M (black), heteroatoms X (grey shaded), tungsten (cross-hatched) and oxygen (white). The hydrogen atoms are omitted for clarity.

The central cavity formed by the annular metal centers M has a diameter of about 4 to 6 Å such as 5 Å and a volume of about 100 to 300 Å$^3$, more preferably 150 to 250 Å$^3$ and most preferably 5×6×6=180 Å$^3$.

The cation A can be a Group Ia, IIa, IIIb, IVb, Vb, VIIb, VIIb, VIIIb, Ib, IIb, IIIa, IVa, Va and VIa metal or an organic cation. (All references to the Periodic Table of the Elements refer to the CAS version as published in Chemical and Engineering News, 63(5), 27, 1985 or as also published in the front cover of The CRC Handbook of Chemistry and Physics, 82nd edition, CRC Press, New York, 2001) Preferably, A is selected from the group consisting of lithium, sodium, potassium, rubidium, cesium, magnesium, calcium, strontium, barium, titanium, vanadium, chromium, lanthanum, lanthanide metal, actinide metal, manganese, iron, cobalt, nickel, copper, zinc, ruthenium, palladium, platinum, tin, antimony, tellurium, phosphonium such as tetraalkylphosphonium, ammonium, guanidinium, tetraalkylammonium, protonated aliphatic amines, protonated aromatic amines or combinations thereof. More preferably, A is selected from sodium, potassium, ammonium and combinations thereof. Generally, A is acting as counterion of the polyanion and is therefore positioned outside of the POM framework.

The number n of cations is dependent on the nature of cation(s) A, namely its/their valence, and the negative charge m of the polyanion which has to be balanced. In any case, the overall charge of all cations A is equal to the charge of the polyanion. In turn, the charge m of the polyanion is dependent on the oxidation state of the heteroatom X, the oxidation state of the transition metal M and the number q of protons associated with the polyoxoanion. m depends on the oxidation state of the atoms present in the polyanion, e.g., it follows from the oxidation states of W (+6), O (−2), H (+1), a given heteroatom X (such as +5 for As and P) and a given transition metal M (such as +3 for Fe and Ru or +2 for Mn). In some embodiments, m is 12, 14, 16, 18, 20, 22, 24, 26, 28, 30, 32, 34, 36, 38 or 40. In a preferred embodiment, m is 18, 20, 22, 24, 26, 28 or 30, and most preferentially m is 24.

The metal M of the polyoxometalates according to the invention is selected from the entire block of transition metals of the Periodic Table of the Elements, i.e. is selected from elements of groups IIIB to IIB (also referred to as Groups 3 to 12 in the new notation) of the Periodic Table of the Elements. Preferably, M is selected from the group consisting of Fe, Ti, V, Cr, Mn, Co, Ni, Cu, Zn, Mo, Ru, Rh, Pd, Cd, Ir, Pt and combinations thereof. Alternately, M is selected from the group consisting of Ti, Cr, Mn, Co, Ni and combinations thereof More preferably, M is Fe. The oxidation state of M comprised in the present polyoxometalates can range from +2 to +5 (e.g. Fe(II), Ti(IV), V(V), Mn(III), Mn(IV), Co(II), Co(III), Mo(VI), Rh(III), Ir(III), Pt(IV) and the like), and preferably is +3 for Fe, Ru and Cr and +2 for most other incorporated transition metals, such as Zn, Cu, Ni or Pd. Alternately the oxidation state of M is +2, +3, +4 or +5.

The heteroatom X of the polyoxometalates according to the invention is As, P or a mixture thereof, and is preferably P.

Accordingly, suitable examples of polyoxometalates according to the invention are represented by the formula such as

, e.g.

.

The invention also includes solvates of the present POMs. A solvate is an association of solvent molecules with a polyoxometalate. Preferably, water is associated with the POMs and thus, the POMs according to the invention can in particular be represented by the formula such as , e.g.

, wherein A, n, m, q, M and X are as defined above, and x represents the number of hydrate water molecules per POM molecule and mostly depends on the type of cations A. In some embodiments x is an integer from 1 to 100, such as 66. In addition when the phrase "is a integer from" is used it is meant to encompass and disclose all integers between the two values to one significant digit. For example phrase "is an integer from 1 to 10" discloses 1, 2, 3, 4, 5, 6, 7, 8, 9/and 10. Thus the phrase "is an integer from 1 to 100" discloses each integer between 1 and 100. In a preferred embodiment, x is an integer from 50 to 80.

A suitable example of the polyoxometalate solvates according to the invention is represented by the formula $Li_{12}K_{12}[Fe_{16}P_8W_{48}O_{184}(OH)_{32}].66H_2O$.

In addition, the polyoxometalates according to the invention or the solvates thereof can also contain one or more equivalents of cocrystallized salt arising from spectator ions present during the synthesis of the POMs, such as alkali halides. Consequently, the cocrystallization product can be represented by the formula

, wherein A, n, m, q, M, and X are as defined above, and
  A' represents an alkali metal,
  Z represents an halide,
  k is the number of equivalents of alkali halide per polyoxometalate molecule and ranges from 0 to 5, and
  x is the number of hydrate water molecules per polyoxometalate molecule and ranges from 0 to 100.

Preferably, A' is K and Z is Cl. Moreover, k is preferably 2.

The invention is further directed to a process for preparing polyoxometalates according to the invention comprising
  (a) reacting a source of $(X_8W_{48}O_{184})^{y-}$ with a source of transition metal M in the presence of an oxidizing agent,
  (b) heating the mixture obtained in step (a), and
  (c) optionally recovering the polyoxometalate obtained in step (b), wherein
  y is the negative charge of the POM-precursor $(X_8W_{48}O_{184})$, X is As, P or a mixture thereof and
  A, n, m, q, M (not shown) are the same as defined above.

In step (a) of the present process a source of $(X_8W_{48}O_{184})^{y-}$ such as a source of $(P_8W_{48}O_{184})^{40-}$ is used, where y− is the negative charge of the POM-precursor $(X_8W_{48}O_{184})$. According to a first embodiment a salt of $[H_pX_8W_{48}O_{184}]^{(y-p)-}$ such as $[H_7X_8W_{48}O_{184}]^{(y-7)-}$ (for example $[H_7P_8W_{48}O_{184}]^{33-}$) or a solvate thereof is used as a source of $(X_8W_{48}O_{184})^{y-}$, wherein p typically ranges from 7 to 8. In particular, mixed potassium-lithium salts of $[H_7P_8W_{48}O_{184}]^{33-}$ such as $K_{28}Li_5[H_7P_8W_{48}O_{184}]$ or solvates thereof, e.g. $K_{28}Li_5[H_7P_8W_{48}O_{184}].92H_2O$, can be used.

In another embodiment, a salt of $[X_2W_{12}O_{48}]^{w-}$ such as $[H_2P_2W_{12}O_{48}]^{12-}$ (for example, $K_{12}[H_2P_2W_{12}O_{48}]$), a salt of $[X_4W_{24}O_{94}]^{v-}$ (where w− is the negative charge of the POM-precursor $[X_2W_{12}O_{48}]^{w-}$ and v− is the negative charge of the POM-precursor $[X_4W_{24}O_{94}]$) such as $[H_6P_4W_{24}O_{94}]^{18-}$ (for example, $K_{16}Li_2[H_6P_4W_{24}O_{94}]$) or any other $(X_8W_{48}O_{184})$-precursor described in Contant and Tézé, Inorg. Chem. 1985, 24, 4610-4614 or Hussain et al., Inorg. Chem. 2006, 45, 761-766 is used as source of $(X_8W_{48}O_{184})^{y-}$. Said source spontaneously forms the polyanion $(X_8W_{48}O_{184})^{y-}$ which then reacts with the transition metal source.

Generally, any water soluble source of M can be used in step (a). In case of Fe, iron salts such as $FeCl_3$, $FeBr_3$, $Fe(NO_3)_3$, $Fe(ClO_4)_3$, $Fe_2(SO_4)_3$, $Fe(CH_3CO_2)_2$, $FeBr_2$, $FeCl_2$, $FeF_2$, $FeI_2$, $Fe(C_2O_4)$, $Fe(ClO_4)_2$, $FeSO_4$ or solvates of these salts such as the hydrates $FeCl_3.6H_2O$, $Fe(NO_3)_3.9H_2O$, $Fe(ClO_4)_3.H_2O$, $Fe_2(SO_4)_3.H_2O$, $FeCl_2.4H_2O$, $FeF_2.4H_2O$, $FeI_2.4H_2O$, $Fe(C_2O_4).2H_2O$, $Fe(ClO_4)_2.H_2O$, $FeSO_4.7H_2O$ can be suitably used. Preferably, the Fe source is $FeCl_3.6H_2O$. Further examples of suitable sources of M are $TiBr_4$, $TiCl_2$, $TiCl_3$, $TiCl_4$, $TiF_3$, $TiF_4$, $TiI_4$, $Ti(NO_3)_4$, $[(CH_3CO_2)_2Cr.H_2O]_2$, $Cr(C_5H_7O_2)_3$, $CrBr_3.6H_2O$, $CrCl_2$, $CrCl_3$, $CrCl_3.6H_2O$, $CrF_2$, $CrF_3$, $CrK(SO_4)_2.12H_2O$, $Cr(NO_3)_3.9H_2O$, $Cr(ClO_4)_3.6H_2O$, $CrPO_4.H_2O$, $VCl_2$, $VCl_3$, $VCl_4$, $VF_4$, $VI_3$, $Mn(CH_3CO_2)_2$, $Mn(CH_3CO_2)_2.4H_2O$, $Mn(CH_3CO_2)_3.2H_2O$, $MnBr_2$, $MnBr_2.4H_2O$, $MnF_2$, $MnF_3$, $MnI_2$, $MnCl_2$, $MnCl_2.4H_2O$, $Mn(NO_3)_2.H_2O$, $MnSO_4.H_2O$, $Co(CH_3CO_2)_2.4H_2O$, $CoBr_2$, $CoBr_2.H_2O$, $CoCl_2$, $CoCl_2.6H_2O$, $CoF_2$, $CoF_3$, $CoI_2$, $Co(NO_3)_2.6H_2O$, $Co(ClO_4)_2.6H_2O$, $Co_3(PO_4)_2$, $CoSO_4.7H_2O$, $NiBr_2$, $NiBr_2.H_2O$, $NiCl_2$, $NiCl_2.H_2O$, $NiI_2$, $Ni(NO_3)_2.6H_2O$, $NiSO_4.6H_2O$, $CuBr$, $CuBr_2$, $CuCl$, $CuCl_2$, $CuCl_2.2H_2O$, $CuF_2$, $CuF_2.H_2O$, $CuSO_4$, $CuSO_4.5H_2O$, $ZnBr_2$, $ZnBr_2.2H_2O$, $ZnCl_2$, $ZnF_2$, $ZnI_2$, $ZnC_2O_4.H_2O$, $Zn_3(PO_4)_2$, $MoBr_3$, $MoCl_3$, $MoCl_5$, $RuBr_3$, $RuCl_3$, $RuI_3$, $RhBr_3.H_2O$, $RhCl_3$, $RhCl_3.H_2O$, $RhPO_4$, $Pd(CH_3CO_2)_2$, $PdBr_2$, $PdCl_2$, $PdI_2$, $Pd(NO_3)_2.H_2O$, $PdSO_4$, $Cd(CH_3CO_2)_2.H_2O$, $CdBr_2$, $CdCl_2$, $CdF_2$, $IrBr_3.H_2O$, $IrCl_3$, $IrCl_4.H_2O$, $PtBr_2$, $PtCl_2$, $PtCl_4$ and $PtI_2$.

Furthermore, the process according to the invention typically requires that step (a) is performed in the presence of an oxidizing agent. Thus, before, during or after mixing the $(X_8W_{48}O_{184})^{y-}$ source with the source of M, an oxidizing agent is added to the reaction mixture. The oxidizing agent can be selected from the group consisting of inorganic oxidants such as $H_2O_2$, $O_2$ and $ClO_4^-$, organic oxidants such as peroxides (e.g. t-$(C_4H_9)$OOH) and peracids. (e.g. $CH_3COOOH$) and combinations thereof. Preferably, $H_2O_2$ and more preferably an aqueous solution of $H_2O_2$ such as a 30% solution of $H_2O_2$ in water is used as oxidizing agent. The molar ratio of oxidizing agent to transition metal M usually ranges from 120:1 to 3:1, preferably from 60:1 to 5:1 and more preferably from 30:1 to 10:1.

It has been found that the course of the reaction of step (a) can be controlled by various parameters such as the nature of the reaction medium, the ratio of the starting materials as well as the reaction temperature used in step (b).

In particular, the reaction of step (a) is preferably performed in an aqueous solution. In one embodiment, the pH of the aqueous solution used in step (a) ranges from 2 to 6, preferably from 3 to 5 and more preferably from 3.5 to 4.5. Most preferably, a pH of about 4.0 is used. Generally, a buffer solution can be used for adjusting the pH. It is particularly preferred to use a lithium acetate buffer having a concentration of 0.5 M and a pH of about 4.0 as aqueous solvent.

In addition, the ratio of the starting materials is considered to have an effect on the preparation of the present POMs. Preferably, the molar ratio of transition metal ions originating from the source of M to the $(X_8W_{48}O_{184})$ polyanions ranges from 5:1 to 100:1 and more preferably from 15:1 to 35:1.

If in step (a) a salt is used as a source of the polyanion $(X_8W_{48}O_{184})$, suitable cations of this salt are for example lithium, sodium, potassium, ammonium, guanidinium, tetraalkylammonium, protonated aliphatic amines and protonated aromatic amines.

In step (b), it is preferred to heat the mixture obtained in step (a) to a reaction temperature of 30 to 100° C., preferably 50 to 100° C. and more preferably 70 to 90° C. Depending on the size of the batch this heating step is preferably performed for about 30 to about 120 min or longer, alternately from about 45 to about 100 min, more preferably for about 60 min.

Optionally, before, during or after the heating step (b) a salt of the cation A is added to the reaction mixture. The salt of A can be added as a solid or in the form of an aqueous solution. The counterions of A can be selected from the group consisting of any stable, non-reducing, water soluble anion, e.g. halides, nitrate, sulfate, acetate. Typically, the chloride salt is used. However, the addition of extra cations A is not necessary if the desired cations are already present during step (a), for example as a counterion of the source of $(X_8W_{48}O_{184})$ or a component of the transition metal precursor. Preferably, all desired cations and anions are already present during step (a) so that there is no optional addition of extra cations and/or anions.

In step (c), the polyoxometalates according to the invention formed in step (b) can be recovered. For example, isolation of the POMs can be effected by common techniques including bulk precipitation or crystallization.

The invention is also directed to the use of polyoxometalates according to the invention for catalyzing homogeneous and heterogeneous oxidation reactions of organic substrates. In particular, the present POMs can be used for oxidizing unsubstituted and substituted hydrocarbons such as branched or unbranched alkanes and alkenes having carbon numbers from C1 to C20, preferably from C1 to C6, cycloalkanes, cycloalkenes, aromatic hydrocarbons or mixtures thereof. Examples of suitable organic substrates are methane, ethane, propane, butane, isobutane, pentane, isopentane, neopentane, hexane, ethylene, propylene, α-butylene, cis-β-butylene, trans-β-butylene, isobutylene, n-pentylene, isopentylene, cyclohexane, adamantane, cyclooctadiene, benzene, toluene, o-xylene, m-xylene, p-xylene, mesitylene, durene, hexamethylbenzene, naphthalene, anthracene, phenantrene and mixtures thereof. As the central cavity of the present POMs and thus the coordination sites of the iron centers are easily accessible to the organic substrate and the oxygen transfer molecule, high catalytic activities are achieved. Further, the remarkable thermal stability of the polyoxoxmetalates permits their use under a great variety of reaction conditions.

Prior to their use in oxidation reactions, the present polyoxometalates can be supported on a solid support. Suitable supports include materials having a high surface area and a pore size which is sufficient to allow the polyoxometalates to be loaded, e.g. aerogels of aluminum oxide and magnesium oxide, titanium oxide, zirconium oxide, silica, mesoporous silica, active carbon, zeolites and mesoporous zeolites. In another embodiment, the supported polyoxometalates are further calcined at a temperature not exceeding the transformation temperature of the polyoxometalate, i.e. the temperature at which decomposition of the polyoxometalate starts to take place, which is found to be more than 900° C. for the present POMs.

Commonly, suitable oxygen donors such as molecular oxygen, peroxides (e.g. $H_2O_2$, t-$(C_4H_9)$OOH) or peracids (e.g. $CH_3COOOH$) can be used as oxidizing agent during the oxidation of the organic substrates. Preferably, the oxidizing agent is an oxygen containing atmosphere. In particular, the oxygen containing atmosphere is air and is preferably constantly passed through the organic substrate (such as an alkane or alkene) at a pressure of 0.01 to 100 bar, preferably 10 to 70 bar.

Moreover, in some embodiments, the oxidation of the organic substrate is preferably carried out at a temperature of 30 to 600° C., preferably 75 to 250° C., preferably 130 to 180° C. In a particularly useful embodiment the oxidation is carried out at a temperature of 100° C. or more, alternately 110° C. or more, alternately 120° C. or more, alternately 130° C. or more, alternately 140° C. or more, alternately 150° C. or more, alternately 160° C. or more, alternately 170° C. or more, alternately 180° C. or more, alternately 190° C. or more, alternately 200° C. or more, alternately 210° C. or more, alternately 220° C. or more. Due to the definite stochiometry of polyoxometalates, the present POMs can be converted (e.g., by calcination at a temperature exceeding the transformation temperature) to mixed metal oxide catalysts in a highly reproducible manner. Consequently, the polyoxometalates according to the invention can also be used as a precursor for mixed metal oxide catalysts such as so-called Mitsubishi-type catalysts which are particularly useful for the oxidation of hydrocarbons such as propane.

Another useful aspect of this invention is that the polyoxometalates (supported or unsupported) described herein can be recycled and used multiple times for the oxidation of organic molecules.

For example the POMs produced herein can be collected after an oxidation reaction, washed with a polar or non-polar solvent, such as acetone then dried under heat (typically 50° C. or more, alternately 100° C. or more, alternately 125° C. or more, alternately 150° C. or more) for 30 minutes to 48 hours, typically for 1 to 24 hours, more typically for 2 to 10 hours, more typically 3 to 5 hours. The recycled supported POMs may be used on fresh organic molecules (such as hexadecane) or on recycled organic molecules from a recycle stream.

Advantageously, the supported polyoxometalates may be recycled and used again under the same or different reaction conditions. Typically the supported POMs are recycled at least 1 time, preferably at least 4 times, preferably at least 8 times, preferably at least 12 times, preferably at least 100 times.

Thus, in a particularly useful embodiment, this invention relates to a process to oxidize organic substrates (typically an alkane) comprising contacting a first organic substrate with one or more polyoxometalates described herein, thereafter recovering the polyoxometalates, contacting the polyoxometalates with a solvent (such as acetone) at a temperature of 50° C. or more to obtain a recycled polyoxometalate, thereafter contacting the recycled polyoxometalate with a second organic substrate, which may be the same or different that the first organic substrate, this process may be repeated many times, preferably at least 4 times, preferably at least 8 times, preferably at least 12 times, preferably at least 100 times.

This invention also relates to:
1. Polyoxometalate represented by the formula $$(A_n)^{m+}[H_qM_{16}X_8W_{48}O_{184}(OH)_{32}]^{m-}$$

or solvates thereof, wherein
A represents a cation,
n is the number of the cations A,
m is the charge of the polyoxoanion,
q is the number of protons and varies from 0 to 12,
M represents a transition metal, and
X represents a heteroatom selected from P, As and mixtures thereof.

2. Polyoxometalate according to paragraph 1, which is in the form of a cocrystallization product having the formula $$(A_n)^{m+}[H_qM_{16}X_8W_{48}O_{184}(OH)_{32}]^{m-}\cdot k(A'Z)\cdot xH_2O,$$

wherein
A' represents an alkali metal,
Z represents an halide,
k is the number of equivalents of alkali halide per polyoxometalate molecule and ranges from 0 to 5,
x is the number of hydrate water molecules per polyoxometalate molecule and ranges from 0 to 100, and
A, n, m, q, M and X are as defined in paragraph 1.

3. Polyoxometalate according to paragraph 2, wherein k is 2, A' is K and Z is Cl.

4. Polyoxometalate according to any one of paragraphs 1 to 3, wherein A is selected from the group consisting of lithium, sodium, potassium, rubidium, cesium, magnesium, calcium, strontium, barium, titanium, vanadium, chromium, lanthanum, lanthanide metal, actinide metal, manganese, iron, cobalt, nickel, copper, zinc, ruthenium, palladium, platinum, tin, antimony, tellurium, phosphonium, ammonium, guanidinium, tetraalkylammonium, protonated aliphatic amines, protonated aromatic amines and combinations thereof.

5. Polyoxometalate according to any one of paragraphs 1 to 4, wherein M is selected from the group consisting of Fe, Ti, V, Cr, Mn, Co, Ni, Cu, Zn, Mo, Ru, Rh, Pd, Cd, Ir, Pt and combinations thereof, and preferably is Fe.

6. Polyoxometalate according to any one of paragraphs 1 to 5, wherein X is P.

7. Polyoxometalate according to any one of paragraphs 1 to 6, wherein the polyoxometalate is represented by the formula $$(A_n)^{24+}[Fe_{16}P_8W_{48}O_{184}(OH)_{32}]^{24-}\cdot xH_2O,$$

wherein x represents the number of hydrate water molecules per polyoxometalate molecule and ranges from 1 to 100, and A and n are as defined in paragraph 1.

8. Process for the preparation of a polyoxometalate according to any one of paragraphs 1 to 7 comprising
(a) reacting a source of $(X_8W_{48}O_{184})^{y-}$ with a source of transition metal M in the presence of an oxidizing agent,
(b) heating the mixture obtained in step (a), and
(c) optionally recovering the polyoxometalate obtained in step (b),
wherein
y is the negative charge of $(X_8W_{48}O_{184})$, and X is P, As or a mixture thereof.

9. Process according to paragraph 8, wherein in step (a) the source of $(X_8W_{48}O_{184})^{y-}$ is a salt of $[H_pX_8W_{48}O_{184}]^{(y-p)-}$ or a solvate thereof, wherein p ranges from 7 to 8, y is the negative charge of $(X_8W_{48}O_{184})$, and X is P, As or a mixture thereof.

10. Process according to paragraph 9, wherein the salt of $[H_pX_8W_{48}O_{184}]$ is a salt of $[H_7P_8W_{48}O_{184}]^{33-}$ such as $K_{28}Li_5[H_7P_8W_{48}O_{184}]$, wherein p ranges from 7 to 8, y is the negative charge of $(X_8W_{48}O_{184})$, and X is P, As or a mixture thereof.

11. Process according to paragraph 8, wherein in step (a) the source of $(X_8W_{48}O_{184})^{y-1}$ is a salt of $[X_2W_{12}O_{48}]^{w-}$ such as $[H_2P_2W_{12}O_{48}]^{12-}$ or a salt of $[X_4W_{24}O_{94}]^{v-}$ such as $[H_6P_4W_{24}O_{94}]^{18-}$.

12. Process according to any one of paragraphs 8 to 11, wherein in step (a) the source of transition metal M is a salt or solvate thereof.

13. Process according to paragraph 12, wherein the salt is selected from the group consisting of $FeCl_3$, $FeBr_3$, $Fe(NO_3)_3$, $Fe(ClO_4)_3$, $Fe_2(SO_4)_3$, $Fe(CH_3CO_2)_2$, $FeBr_2$, FeCl$_2$, FeF$_2$, FeI$_2$, Fe(C$_2$O$_4$), Fe(ClO$_4$)$_2$, FeSO$_4$ and solvates of these salts such as FeCl$_3$.6H$_2$O, Fe(NO$_3$)$_3$.9H$_2$O, Fe(ClO$_4$)$_3$.H$_2$O, Fe$_2$(SO$_4$)$_3$.H$_2$O, FeCl$_2$.4H$_2$O, FeF$_2$.4H$_2$O, FeI$_2$.4H$_2$O, Fe(C$_2$O$_4$).2H$_2$O, Fe(ClO$_4$)$_2$.H$_2$O, FeSO$_4$.7H$_2$O.

14. Process according to any one of paragraphs 8 to 13, wherein in step (a) the oxidizing agent is selected from the group consisting of inorganic oxidants such as H$_2$O$_2$, O$_2$, ClO$_4^-$ and organic oxidants such as peroxids (e.g. t-(C$_4$H$_9$)OOH), peracids (e.g. CH$_3$COOOH) and combinations thereof.

15. Process according to paragraph 14, wherein the oxidizing agent is H$_2$O$_2$.

16. Process according to any one of paragraphs 8 to 15, wherein step (a) is performed in an aqueous solution.

17. Process according to paragraph 16, wherein the pH of the aqueous solution ranges from 2 to 6, preferably from 3.5 to 4.5.

18. Process according to paragraph 16 or 17, wherein in step (a) a lithium acetate buffer having a concentration of 0.5 M is used as aqueous solvent.

19. Process according to any one of paragraphs 8 to 18, wherein in step (b) the mixture is heated to a temperature of 50 to 100° C., preferably 70 to 90° C.

20. Process according to any one of paragraphs 8 to 19, wherein prior to, during or after step (b) a salt of A is added to the reaction mixture.

21. Process according to any one of paragraphs 8 to 20, wherein in step (c) the product is isolated by bulk precipitation or crystallization.

22. Use of a polyoxometalate according to any one of paragraphs 1 to 7 or prepared according to any one of paragraphs 8 to 21 as catalyst for the homogeneous or heterogeneous oxidation of organic substrates.

23. Use according to paragraph 22, wherein the organic substrates are unsubstituted or substituted hydrocarbons such as branched or unbranched alkanes and alkenes having carbon numbers from C1 to C20, cycloalkanes, cycloalkenes, aromatic hydrocarbons or mixtures thereof.

24. Use according to paragraph 22 or 23, wherein the polyoxometalate is supported on a solid support.

25. Use according to paragraph 24, wherein the supported polyoxometalate is calcined at a temperature not exceeding the transformation temperature of the polyoxometalate.

26. Use of a polyoxometalate according to any one of paragraphs 1 to 7 or prepared according to any one of paragraphs 8 to 21 as a precursor for preparing mixed metal oxide catalysts.

27. Use according to paragraph 26, wherein the mixed metal oxide catalysts are Mitsubishi-type catalysts.

28. The use according to any of paragraphs 22 to 25 wherein an oxygen donor is present during the oxidation.

29. The use according to any of paragraphs 22, 23, 24, 25 or 29 wherein air is constantly passed through the organic substrate during the oxidation.

30. The use according to any of paragraphs 22, 23, 24, 25, 28 or 29 wherein the oxidation takes place at a temperature of 30 to 600° C.

31. The use according to any of paragraphs 22, 23, 24, 25, 29, 29 or 30 further comprising 1) recovering the polyoxometalates, 2) contacting the polyoxometalates with a solvent at a temperature of 50° C. or more to obtain a recycled polyoxometalate, 3) thereafter contacting the recycled polyoxometalate with a second organic substrate, which may be the same or different than the first organic substrate.

32. The process of paragraph 31 wherein the polyoxometalate is recycled at least 4 times.

The invention is further illustrated by the following example.

EXAMPLE 1

A sample of K$_{28}$Li$_5$[H$_7$P$_8$W$_{48}$O$_{184}$].92H$_2$O (0.370 g, 0.025 mmol; pre-pared according to Inorg. Synth. 1990, 27, 110-111) was dissolved in a 0.5M LiCH$_3$COO/CH$_3$COOH buffer solution (20 ml) at pH 4.0. Then 0.169 g of FeCl$_3$.6H$_2$O (0.625 mmol) was added. During the reaction 10 drops of 30% H$_2$O$_2$ solution in water were added to the solution. Then the solution was heated to 80° C. for 1 h and filtered hot. The filtrate was layered with 1 M KCl (1 ml) and then allowed to evaporate in an open beaker at room temperature. After one week a dark yellowish crystalline product started to appear. Evaporation was continued until the solution level had approached the solid product, which was then collected by filtration and air dried. The yield was 0.083 g (22%).

IR (cm-1): 1046(s), 1019(m), 952(s), 927(s), 794(s), 753(s), 689(s), 647(sh), 559(w), 524(w), 471(w) (measured on a Nicolet-Avatar 370 spectrometer using KBr pellets).

Besides IR the product was also characterized by single crystal XRD. The crystal data and structure refinement obtained on a Bruker Kappa APEX II instrument using the SHELXTL software package are shown in the following table.

TABLE 1

Crystal data and structure refinement for Li$_{12}$K$_{12}$[Fe$_{16}$P$_8$W$_{48}$O$_{184}$(OH)$_{32}$]•2KCl•66H$_2$O.

| | |
|---|---|
| Identification code | fep |
| Empirical formula | H164 Cl2 Fe16 K14 Li12 O282 P8 W48 |
| Formula weight | 14863.32 |
| Temperature | 173(2) K |
| Wavelength | 0.71073 Å |
| Crystal system | Orthorhombic |
| Space group | Pnnm |
| Unit cell dimensions | a = 36.3777(9) Å α = 90°. |
| | b = 13.9708(3) Å β = 90°. |
| | c = 26.9140(7) Å γ = 90°. |
| Volume | 13678.4(6) Å$^3$ |
| Z | 2 |
| Density (calculated) | 3.609 Mg/m$^3$ |
| Absorption coefficient | 21.268 mm$^{-1}$ |
| F(000) | 13188 |
| Crystal size | 0.33 × 0.12 × 0.06 mm$^3$ |
| Theta range for data collection | 2.76 to 26.41°. |
| Index ranges | −45 <= h <= 45, −17 <= k <= 17, −33 <= l <= 33 |
| Reflections collected | 335706 |
| Independent reflections | 14333 [R(int) = 0.1527] |
| Completeness to theta = 26.41° | 99.7% |
| Absorption correction | Semi-empirical from equivalents |
| Max. and min. transmission | 0.3822 and 0.1281 |
| Refinement method | Full-matrix least-squares on F$^2$ |
| Data/restraints/parameters | 14333/0/492 |
| Goodness-of-fit on F$^2$ | 1.018 |
| Final R indices [I > 2sigma(I)] | R1 = 0.0593, wR2 = 0.1592 |
| R indices (all data) | R1 = 0.0886, wR2 = 0.1828 |
| Largest diff. peak and hole | 4.198 and −3.478 e.Å$^{-3}$ |

The atomic coordinates as well as the equivalent isotropic displacement parameters which are defined as one third of the trace of the orthogonalized U$^{ij}$ tensor are shown in Table 2.

TABLE 2

Atomic coordinates x, y and z (·10⁴ Å) and equivalent isotropic displacement parameters U(eq) (·10³ Å²) for $Li_{12}K_{12}[Fe_{16}P_8W_{48}O_{184}(OH)_{32}]\cdot 2KCl\cdot 66H_2O$.

| | x | y | z | U(eq) |
|---|---|---|---|---|
| W(1) | 1384(1) | −990(1) | 703(1) | 21(1) |
| W(2) | 2380(1) | −1536(1) | 707(1) | 32(1) |
| W(3) | 2692(1) | −3780(1) | 708(1) | 41(1) |
| W(4) | 2055(1) | −5839(1) | 704(1) | 22(1) |
| W(5) | 2124(1) | −4307(1) | 1844(1) | 37(1) |
| W(6) | 1813(1) | −2039(1) | 1845(1) | 33(1) |
| W(7) | 1132(1) | −2672(1) | 2828(1) | 33(1) |
| W(8) | 1442(1) | −4943(1) | 2834(1) | 38(1) |
| W(9) | 820(1) | −6965(1) | 2477(1) | 21(1) |
| W(10) | 645(1) | −5663(1) | 3646(1) | 39(1) |
| W(11) | 345(1) | −3422(1) | 3647(1) | 39(1) |
| W(12) | 162(1) | −2145(1) | 2471(1) | 22(1) |
| P(1) | 1745(1) | −3395(3) | 772(2) | 18(1) |
| P(2) | 542(1) | −4503(3) | 2509(2) | 16(1) |
| Fe(1) | 634(1) | −5804(2) | 1493(1) | 18(1) |
| Fe(2) | 870(1) | −2830(2) | 663(1) | 19(1) |
| Fe(3) | 296(1) | −3347(2) | 1492(1) | 19(1) |
| Fe(4) | 1208(1) | −5291(2) | 659(1) | 21(1) |
| Cl(1) | 259(2) | −6933(7) | 0 | 53(2) |
| O(1FE) | 230(3) | −6647(9) | 1414(5) | 25(3) |
| O(1A) | 1329(5) | −993(12) | 0 | 25(4) |
| O(1WF) | 924(3) | −1460(9) | 830(5) | 25(3) |
| O(1T) | 1328(4) | 212(9) | 823(5) | 31(3) |
| O(2FE) | 758(4) | −2455(12) | 0 | 21(3) |
| O(2A) | 2469(5) | −1581(12) | 0 | 27(4) |
| O(2T) | 2630(3) | −497(8) | 827(5) | 24(3) |
| O(3A) | 2751(5) | −3599(13) | 0 | 29(4) |
| O(3T) | 3132(4) | −4190(10) | 837(6) | 38(3) |
| O(4FE) | 1213(5) | −5784(12) | 0 | 22(4) |
| O(4A) | 2021(5) | −5945(12) | 0 | 23(4) |
| O(4WF) | 1596(3) | −6240(9) | 822(5) | 26(3) |
| O(4T) | 2308(3) | −6834(9) | 830(5) | 29(3) |
| O(5T) | 2412(4) | −4833(10) | 2258(5) | 35(3) |
| O(6T) | 1914(4) | −1165(9) | 2266(5) | 31(3) |
| O(7T) | 1329(4) | −1694(9) | 3111(5) | 30(3) |
| O(8T) | 1836(4) | −5377(9) | 3107(5) | 30(3) |
| O(9T) | 1053(3) | −7991(9) | 2625(5) | 26(3) |
| O(9WF) | 902(3) | −6842(8) | 1827(5) | 23(3) |
| O(10T) | 828(4) | −6305(9) | 4133(5) | 30(3) |
| O(10A) | 139(4) | −6019(9) | 3758(5) | 33(3) |
| O(1P1) | 1435(3) | −2705(8) | 600(4) | 21(2) |
| O(11T) | 341(4) | −2628(10) | 4138(5) | 35(3) |
| O(1P2) | 943(3) | −4128(8) | 2518(4) | 20(2) |
| O(12) | 1909(3) | −1091(8) | 580(5) | 24(3) |
| O(12T) | 99(3) | −951(9) | 2620(5) | 28(3) |
| O(13F) | 350(3) | −4685(8) | 1266(5) | 24(3) |
| O(14G) | 812(3) | −6169(8) | 833(4) | 22(3) |
| O(14F) | 1118(3) | −4936(8) | 1428(4) | 22(3) |
| O(16) | 1526(3) | −1391(8) | 1382(5) | 24(3) |
| O(2P1) | 2121(3) | −3039(9) | 585(5) | 24(3) |
| O(2P2) | 541(3) | −5466(8) | 2238(4) | 20(2) |
| O(23G) | 352(3) | −2804(8) | 836(4) | 21(2) |
| O(23F) | 876(3) | −3224(9) | 1432(5) | 25(3) |
| O(23) | 2774(3) | −2442(9) | 794(5) | 27(3) |
| O(24F) | 883(3) | −4219(8) | 508(5) | 23(3) |
| O(26) | 2228(3) | −1758(9) | 1391(5) | 28(3) |
| O(3P1) | 1678(3) | −4420(8) | 602(4) | 20(2) |
| O(3P2) | 415(3) | −4622(8) | 3050(4) | 21(2) |
| O(34) | 2434(3) | −4895(9) | 585(5) | 25(3) |
| O(35) | 2503(3) | −3840(9) | 1392(5) | 31(3) |
| O(4P1) | 1753(3) | −3377(8) | 1349(4) | 18(2) |
| O(4P2) | 307(3) | −3763(8) | 2239(5) | 23(3) |
| O(45) | 2056(3) | −5267(8) | 1381(4) | 20(2) |
| O(56) | 2089(3) | −3049(8) | 2144(4) | 22(3) |
| O(58) | 1663(4) | −4676(9) | 2182(5) | 30(3) |
| O(67) | 1369(4) | −2522(9) | 2180(5) | 31(3) |
| O(78) | 1493(3) | −3632(9) | 3004(5) | 27(3) |
| O(89) | 1231(3) | −6045(9) | 2580(5) | 23(3) |
| O(101) | 552(3) | −4480(9) | 3989(5) | 29(3) |
| O(112) | 145(3) | −2717(8) | 3133(4) | 23(3) |
| O(123) | 249(3) | −2088(8) | 1811(5) | 24(3) |
| O(711) | 835(3) | −3075(9) | 3395(5) | 26(3) |
| O(712) | 700(3) | −2184(8) | 2585(4) | 23(3) |
| O(810) | 1115(3) | −5131(9) | 3403(5) | 27(3) |
| O(910) | 337(3) | −7468(8) | 2412(4) | 18(2) |
| O(91A) | 670(3) | −6531(8) | 3130(4) | 20(2) |
| K(1) | 2581(1) | −4805(4) | 3242(2) | 45(1) |
| K(2) | 1270(2) | 2074(4) | 1133(3) | 63(2) |
| K(3) | 711(3) | −3423(9) | 5000 | 48(3) |
| K(4) | 2004(3) | −766(9) | 3296(5) | 41(3) |
| K(5) | 242(4) | −775(10) | 1039(6) | 34(3) |
| O(1W) | 1362(7) | 2141(17) | 0 | 54(6) |
| O(2W) | 2977(5) | −3673(14) | 3930(7) | 64(5) |
| O(3W) | 500(6) | 1590(16) | 1154(8) | 68(6) |
| O(4W) | 2123(8) | −3340(20) | 3648(12) | 69(8) |
| O(5W) | 1243(13) | 350(30) | 1950(18) | 63(12) |
| O(6W) | 681(13) | 1160(30) | 0 | 70(13) |
| O(7W) | −52(16) | −4100(40) | 5000 | 70(15) |
| O(8W) | 3307(9) | −6510(20) | 825(12) | 64(8) |
| O(9W) | 2958(7) | −4149(17) | 5000 | 51(6) |
| O(10W) | 987(7) | −5294(19) | 5000 | 63(7) |
| O(11W) | 3424(6) | −1793(14) | 1156(8) | 48(5) |
| O(12W) | 1294(6) | −3243(16) | 4272(9) | 66(6) |
| O(13W) | 1792(6) | −7005(16) | 1949(9) | 65(6) |
| O(14W) | 719(8) | 130(20) | 2908(10) | 72(7) |
| O(15W) | 3376(8) | −1860(20) | 0 | 64(8) |
| O(16W) | −449(7) | −1576(18) | 3661(10) | 55(6) |
| O(17W) | 387(10) | −690(30) | 0 | 77(11) |
| O(18W) | 2926(10) | −6360(30) | 0 | 57(9) |
| O(19W) | 3836(7) | −3279(19) | 1147(11) | 65(7) |
| O(20W) | 3366(10) | −130(30) | 699(13) | 67(10) |

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

The invention claimed is:

1. A Polyoxometalate represented by the formula or solvates thereof, wherein
A represents a cation,
n is the number of the cations A,
m is the charge of the polyoxoanion,
q is the number of protons and varies from 0 to 12,
M represents a transition metal, and
X represents a heteroatom selected from the group consisting of P, As and mixtures thereof.

2. The Polyoxometalate according to claim 1, which is in the form of a cocrystallization product having the formula wherein
A represents a cation,
n is the number of the cations A.
m is the charge of the polyoxoanion,
q is the number of protons and varies from 0 to 12,
M represents a transition metal, and
X represents a heteroatom selected from the group consisting of P, As and mixtures thereof,
A' represents an alkali metal, Z represents a halide, k is the number of equivalents of alkali halide per polyoxometalate molecule and ranges from 0 to 5, x is the number of hydrate water molecules per polyoxometalate molecule and ranges from 0 to 100.

3. The Polyoxometalate according to claim 2, wherein k is 2, A' is K and Z is Cl.

4. The Polyoxometalate according to claim 1, wherein A is selected from the group consisting of lithium, sodium, potassium, rubidium, cesium, magnesium, calcium, strontium, barium, titanium, vanadium, chromium, lanthanum, lanthanide metal, actinide metal, manganese, iron, cobalt, nickel, copper, zinc, ruthenium, palladium, platinum, tin, antimony, tellurium, phosphonium, ammonium, guanidinium, tetraalkylammonium, protonated aliphatic amines, protonated aromatic amines and combinations thereof.

5. The Polyoxometalate according to claim 1, wherein M is selected from the group consisting of Fe, Ti, V, Cr, Mn, Co, Ni, Cu, Zn, Mo, Ru, Rh, Pd, Cd, Ir, Pt and combinations thereof.

6. Polyoxometalate according to claim 1, wherein X is P.

7. Polyoxometalate according to claim 1, wherein the polyoxometalate is represented by the formula $$(A_n)^{24+}[Fe_{16}P_8W_{48}O_{184}(OH)_{32}]^{24-} \cdot xH_2O,$$

wherein x represents the number of hydrate water molecules per polyoxometalate molecule and ranges from 1 to 100, A represents a cation, and n is the number of the cations A.

8. The Polyoxometalate according to claim 1, wherein M is Fe.

9. A process to prepare a mixed metal oxide catalyst comprising calcining the polyoxometalates of claim 1 at a temperature exceeding the transformation temperature of the polyoxometalates.

10. The process of claim 9, wherein the mixed metal oxide catalysts are Mitsubishi-type catalysts.

11. A Process for the preparation of a polyoxometalate represented by the formula $$(A_n)^{m+}[H_qM_{16}X_8W_{48}O_{184}(OH)_{32}]^{m-}$$

or solvates thereof, wherein

A represents a cation, n is the number of the cations A, m is the charge of the polyoxoanion, q is the number of protons and varies from 0 to 12, M represents a transition metal, and X represents a heteroatom selected from P, As and mixtures thereof, comprising:

(a) reacting a source of $(X_8W_{48}O_{184})^{y-}$ with a source of transition metal M in the presence of an oxidizing agent, (b) heating the mixture obtained in step (a) so as to obtain the polyoxometalate, and (c) optionally recovering the polyoxometalate obtained in step (b), wherein y is the negative charge of $(X_8W_{48}O_{184})$.

12. The process according to claim 11, wherein in step (a) the source of $(X_8W_{48}O_{184})^{y-}$ is a salt of $[H_pX_8W_{48}O_{184}]^{(y-p)-}$ or a solvate thereof, wherein p ranges from 7 to 8 and y is the negative charge of $(X_8W_{48}O_{184})$.

13. The Process according to claim 12, wherein the salt of $[H_pX_8W_{48}O_{184}]^{(y-p)-}$ is a salt of $[H_7P_8W_{48}O_{184}]^{33-}$.

14. The Process according to claim 11, wherein in step (a) the source of $(X_8W_{48}O_{184})^{y-}$ is a salt of $[X_2W_{12}O_{48}]^{w-}$ or a salt of $[X_4W_{24}O_{94}]^{v-}$, wherein w− is the negative charge of $(X_2W_{12}O_{48})$ and v− is the negative charge of $(X_4W_{24}O_{94})$.

15. The Process according to claim 11, wherein in step (a) the source of transition metal M is a salt or solvate thereof.

16. The Process according to claim 15, wherein the salt is selected from the group consisting of $FeCl_3$, $FeBr_3$, $Fe(NO_3)_3$, $Fe(ClO_4)_3$, $Fe_2(SO_4)_3$, $Fe(CH_3CO_2)_2$, $FeBr_2$, $FeCl_2$, $FeF_2$, $FeI_2$, $Fe(C_2O_4)$, $Fe(ClO_4)_2$, $FeSO_4$, solvates of these salts and mixtures thereof.

17. The Process according to claim 11, wherein in step (a) the oxidizing agent is selected from the group consisting of inorganic oxidants, organic oxidants and combinations thereof.

18. The Process according to claim 17, wherein the oxidizing agent is $H_2O_2$.

19. The Process according to claim 11, wherein step (a) is performed in an aqueous solution.

20. The Process according to claim 19, wherein the pH of the aqueous solution ranges from 2 to 6.

21. The Process according to claim 19, wherein in step (a) a lithium acetate buffer having a concentration of 0.5 M is used as the aqueous solution.

22. The Process according to claim 11, wherein in step (b) the mixture is heated to a temperature of 50 to 100° C.

23. The Process according to claim 11, wherein prior to, during or after step (b) a salt of A is added to the reaction mixture.

24. The Process according to claim 11, wherein in step (c) the product is isolated by bulk precipitation or crystallization.

25. The Process according to claim 11, wherein in step (a) the source of $(X_8W_{48}O_{184})^{y-}$ is a salt of $[H_2P_2W_{12}O_{48}]^{12-}$ or a salt of $[H_6P_4W_{24}O_{94}]^{18-}$.

26. Process according to claim 15, wherein the salt is selected from the group consisting of $FeCl_3 \cdot 6H_2O$, $Fe(NO_3)_3 \cdot 9H_2O$, $Fe(ClO_4)_3 \cdot H_2O$, $Fe_2(SO_4)_3 \cdot H_2O$, $FeCl_2 \cdot 4H_2O$, $FeF_2 \cdot 4H_2O$, $FeI_2 \cdot 4H_2O$, $Fe(C_2O_4) \cdot 2H_2O$, $Fe(ClO_4)_2 \cdot H_2O$, $FeSO_4 \cdot 7H_2O$ and mixtures thereof.

27. The Process according to claim 11, wherein in step (a) the oxidizing agent is selected from the group consisting of peroxides, peracids and combinations thereof.

28. The Process according to claim 11, wherein in step (a) the oxidizing agent is selected from the group consisting of $H_2O_2$, $O_2$, $ClO_4^-$, $t\text{-}(C_4H_9)OOH)$, $(CH_3COOOH)$ and combinations thereof.

29. The Process according to claim 19, wherein the pH of the aqueous solution ranges from 3.5 to 4.5.

30. The Process according to claim 11, wherein in step (b) the mixture is heated to a temperature of 70 to 90° C.

31. A process for the homogeneous or heterogeneous oxidation of organic substrates comprising contacting, in the presence of an oxidizing agent, the organic substrate with a polyoxometalate represented by the formula $$(A_n)^{m+}[H_qM_{16}X_8W_{48}O_{184}(OH)_{32}]^{m-}$$

or solvates thereof, wherein

A represents a cation, n is the number of the cations A, m is the charge of the polyoxoanion, q is the number of protons and varies from 0 to 12, M represents a transition metal, and X represents a heteroatom selected from the group consisting of P, As and mixtures thereof.

32. The Process according to claim 31, wherein the organic substrates are unsubstituted or substituted hydrocarbons.

33. The Process according to claim 31, wherein the polyoxometalate is supported on a solid support.

34. The Process according to claim 33, wherein the supported polyoxometalate is calcined at a temperature not exceeding the transformation temperature of the polyoxometalate.

35. The Process of claim 31 wherein an oxygen donor is present during the oxidation.

36. The Process of claim 31 wherein air is constantly passed through the organic substrate during the oxidation.

37. The Process of claim 31 wherein the oxidation takes place at a temperature of 30 to 600° C.

38. The Process of claim 31 further comprising 1) recovering the polyoxometalates, 2) contacting the polyoxometalates with a solvent at a temperature of 50° C. or more to obtain a recycled polyoxometalate, and 3) thereafter contacting the recycled polyoxometalate with a second organic substrate, which may be the same or different than the first organic substrate.

39. The Process of claim 38 wherein the polyoxometalate is recycled at least 4 times.

* * * * *